(12) United States Patent
Matumoto et al.

(10) Patent No.: US 7,134,877 B2
(45) Date of Patent: Nov. 14, 2006

(54) DEMONSTRATION SYSTEM OF ELECTRONIC EQUIPMENT AND DEMONSTRATION METHOD FOR ELECTRONIC EQUIPMENT

(75) Inventors: Isao Matumoto, Saitama (JP); Hironori Kobayashi, Saitama (JP); Norifumi Nishida, Saitama (JP); Makoto Fukuya, Saitama (JP); Naoya Shibata, Tokyo (JP); Tetsuya Natori, Tokyo (JP); Kouji Maeda, Tokyo (JP)

(73) Assignee: Pioneer Corporation, Tokyo (JP)

( * ) Notice: Subject to any disclaimer, the term of this patent is extended or adjusted under 35 U.S.C. 154(b) by 227 days.

(21) Appl. No.: 10/316,029

(22) Filed: Dec. 11, 2002

(65) Prior Publication Data

US 2003/0113702 A1 Jun. 19, 2003

(30) Foreign Application Priority Data

Dec. 17, 2001 (JP) ............................ P2001-382692

(51) Int. Cl.
*G09B 11/00* (2006.01)
(52) U.S. Cl. ...................... 434/379; 434/118; 455/346
(58) Field of Classification Search .................. 434/29, 434/62, 308, 309, 365, 373, 379, 382, 118; 463/20
See application file for complete search history.

(56) References Cited

U.S. PATENT DOCUMENTS 3,883,961 A * 5/1975 Limouze ...................... 434/12
4,301,753 A * 11/1981 Meier ..................... 112/470.04
4,316,720 A * 2/1982 Ackerman ................... 434/224
4,604,064 A * 8/1986 Boehm et al. .............. 434/224
5,261,824 A * 11/1993 Ness .......................... 434/365
5,273,434 A * 12/1993 Peck .......................... 434/224
5,456,605 A * 10/1995 Borbas et al. .............. 434/111
5,499,019 A    3/1996 Burgan et al.
5,606,624 A *  2/1997 Damato ...................... 381/332
5,815,468 A *  9/1998 Muramatsu et al. ........... 369/2
5,848,042 A * 12/1998 Takahashi et al. .......... 360/137
5,862,468 A *  1/1999 Kim .......................... 455/348
5,923,624 A    7/1999 Groeger et al.
6,275,231 B1 * 8/2001 Obradovich ................ 715/970
6,695,696 B1 * 2/2004 Kaminkow .................. 463/16
2002/0160351 A1* 10/2002 Williams .................... 434/365

FOREIGN PATENT DOCUMENTS

EP           0 943 496 A1    9/1999

* cited by examiner

*Primary Examiner*—Kathleen Mosser
(74) *Attorney, Agent, or Firm*—Sughrue Mion, PLLC

(57) ABSTRACT

A demonstration system of an electronic equipment. The electronic equipment includes first and second operation units which are arranged on a front panel of the electronic equipment. In the first operation unit, there are provided display device, various operation keys, demonstration key, light receiving part, and opening/closing key. In the second operation unit, there are provided an operation key and a display device. The demonstration key is an input key for giving a command to start a demonstration of the electronic equipment. A display demonstration, in which the display devices are used, and a movable section demonstration, in which the first and the second operation unit are operated, are continuously conducted.

17 Claims, 11 Drawing Sheets

DEMONSTRATION SYSTEM OF ELECTRONIC EQUIPMENT AND DEMONSTRATION METHOD FOR ELECTRONIC EQUIPMENT

The present disclosure relates to the subject matter contained in Japanese Patent Application No. 2001-382692 filed Dec. 17, 2001, which is incorporated herein by reference in its entirety.

BACKGROUND OF THE INVENTION

1. Field of the Invention

The present invention relates to a demonstration system and method of an electronic equipment attached to a moving body such as a vehicle, wherein a plurality of movable operation units are arranged on a front panel of the electronic equipment.

2. Description of the Related Art

Conventionally, various car audio apparatus such as a CD (Compact Disc) player, a DVD player, an MD (Mini Disc) player and an AM/FM tuner mounted in an instrument panel of a vehicle, and a car audio apparatus in which these are combined integrally or in which these are integrated with a navigation apparatus are used as electronic equipments. Also, there is a type having means for operating the electronic equipment by remote control.

In these car audio apparatus, operation functions tend to increase and the operation tends to become complicated, and many operation functions need be attached on an instrument panel, the area of which is limited. As a measure to this, various proposals have been made. For example, a system in which a plurality of operation units having operation keys are provided oppositely backward and forward in the front of a car audio apparatus and operation functions or display functions are distributed and provided to the respective operation units has been proposed. Further, a system for performing operation by remote control in addition to such an apparatus has been proposed.

However, in the system in which a plurality of operation units are provided as described above and further those operation units are movable, it is difficult to make a user understand the functions of the electronic equipment sufficiently by using a display section for explaining the functions. Further, it is difficult to make the user understand how the movable operation units are operated.

SUMMARY OF THE INVENTION

An object of the present invention is to provide a system and method of an electronic equipment demonstration for making a user understand functions of the electronic equipment by using a display section and by operating an operation unit for explaining the functions.

The present invention provides a demonstration system of an electronic equipment, comprising: a movable operation unit being disposed on a front panel of the electronic equipment, the operation unit having an operation face, wherein the operation unit comprises: a plurality of input operation parts for inputting a command of operation of the electronic equipment; a demonstration operation part for giving a command of starting demonstration; and a display part for displaying information pertaining to the electronic equipment, wherein the electronic equipment comprises: a movement control part for controlling a movement of the operation unit; a display controller for controlling a display demonstration of the display part; and a drive controller for controlling a movable section demonstration.

According to the demonstration system of an electronic equipment of the present invention, the movable operation unit is provided at a position corresponding to the front panel section of electronic equipment. The movable operation unit is moved to a state in which the display part can be easily recognized by a user. Examples of the electronic equipment are an audio playback for playing back a CD (Compact-Disc) or MD (Mini-Disc), and a radio receiving set. On the front panel of the electronic equipment, there is provided the input operation parts in the movable operation unit for operating the electronic equipment. The operation unit is provided with a demonstration operation part for starting demonstration of the electronic equipment.

The demonstration of the electronic equipment includes a display demonstration using a display part and a movable section demonstration showing an actual movement of the operation unit. There is provided a controller for controlling each demonstration.

Accordingly, when a user operates the demonstration operation part, the user can see the display demonstration for successively displaying information of the electronic equipment on the display part. In addition to that, the user can see the movable section demonstration to demonstrate an actual movement of the operation unit. Therefore, it is possible for the user to quickly, positively understand the functions provided in the electronic equipment.

In another embodiment of the electronic equipment demonstration system of the present invention, there is provided a controller for continuously conducting the display demonstration and the movable section demonstration under a predetermined condition.

According to this embodiment, it is possible to continuously conduct a demonstration regarding the display and a demonstration regarding the movable section under the condition. The demonstration regarding the display and the demonstration regarding the movable section may be alternately conducted for each function. In this way, the user can continuously see the demonstration conducted by the display part and the demonstration conducted by the movable section. Therefore, functions of the electronic equipment can be easily understood.

In one embodiment of the electronic equipment demonstration system of the present invention, the aforementioned predetermined condition is at least one of the number of times of continuous execution of the display demonstration and the number of times of continuous execution of the movable section demonstration.

According to this embodiment, after the display demonstration has been repeated by the predetermined number of times, the movable section demonstration is successively repeated by the predetermined number of times, and then completed. Alternatively, on the contrary, after the movable section demonstration has been repeated by the predetermined number of times, the display demonstration may be conducted.

In one embodiment of the electronic equipment of the present invention, the operation unit comprises a plurality of operation units which can be individually moved, and these operation units are arranged on the front panel of the electronic equipment being put on each other.

According to this embodiment, the plurality of operation units are arranged on the front panel of the electronic equipment, and each operation unit operates individually. Accordingly, it is possible to arrange many operation means in a small space on the instrument panel of a vehicle.

Further, it is possible to ensure a space in which a large display part having high-resolution can be arranged. Therefore, the functions can be explained in more detail. An example of the display part having high-resolution is Organic Electro-Luminescence.

In one embodiment of the electronic equipment of the present invention, the controller for controlling the display demonstration conducted by the display part of the operation unit includes a rewritable control program.

According to this embodiment, when the control program is rewritten, a form of the display demonstration can be arbitrarily set.

In one embodiment of the electronic equipment of the present invention, the controller for controlling the movable section demonstration conducted by the movement control part of the operation unit includes a rewritable control program.

According to this embodiment, when the control program is rewritten, a form of the movable section demonstration can be arbitrarily set.

According to one embodiment of the electronic equipment demonstration system of the present invention, in the control program of the controller for controlling the display demonstration of the display part of the operation unit, the number of times of the display demonstration can be set by the input operation part.

According to this embodiment, the number of times of the display demonstration can be simply set by the input operation part provided in the operation unit.

According to one embodiment of the electronic equipment demonstration system of the present invention, in the control program of the controller for controlling the movable section demonstration conducted by the movement control parts of the operation unit, the number of times of the movable section demonstration can be set by the input operation part.

According to this embodiment, the number of times of the movable section demonstration can be simply set by the operation means provided in the operation unit.

According to one embodiment of the electronic equipment demonstration system of the present invention, the demonstration operation part is structured by operation keys of the operation unit.

According to this embodiment, it is unnecessary to provide an exclusive demonstration control part in the operation unit, and it becomes possible to start a demonstration by simultaneously operate several means for operating the electronic equipment. In this way, an operation face of the operation unit, area of which is limited, is effectively used.

According to one embodiment of the electronic equipment demonstration system of the present invention, there is provided a receiving part for receiving a remote control signal in a predetermined portion of the operation unit arranged on the front face of the plurality of operation units.

According to this embodiment, it is possible to operate the electronic equipment by remote control, and at the same time it is possible to control a demonstration by remote control. In order to conduct remote controlling, it is preferable to use a means for sending a signal by modulating infrared rays.

The present invention also provides a demonstration method for an electronic equipment, on a front panel of which a movable operation unit is disposed, the method comprising: inputting a command to operate the electronic equipment; starting a demonstration by giving a command to start demonstration; displaying a state of operation of the electronic equipment; controlling a display demonstration of the operation unit; and controlling a movable section demonstration of the operation unit.

According to the method of electronic equipment demonstration of the present invention, as a demonstration of the electronic equipment, the display demonstration in which the display part of the operation unit is used and the movable section demonstration for showing the motion of the operation unit are conducted. Since the respective demonstration is independently controlled, it is possible to show an individual form of the demonstration.

Accordingly, when the user operates the demonstration operation part, it is possible for the user to see the display demonstration in which information of the electronic equipment is successively shown on the display part. In addition to that, it is possible for the user to see the movable section demonstration of the movement of the operation unit.

According to another embodiment of the electronic equipment control method of the present invention, there is provided a control process in which the display demonstration and the movable section demonstration are continuously conducted.

Since the user can continuously observe the display demonstration and the movable section demonstration, it is possible for the user to quickly, precisely understand the functions of the electronic equipment.

The operation and effect of the present invention will become apparent from the following description of embodiments.

DETAILED DESCRIPTION OF THE PREFERRED EMBODIMENTS

Figure 1:
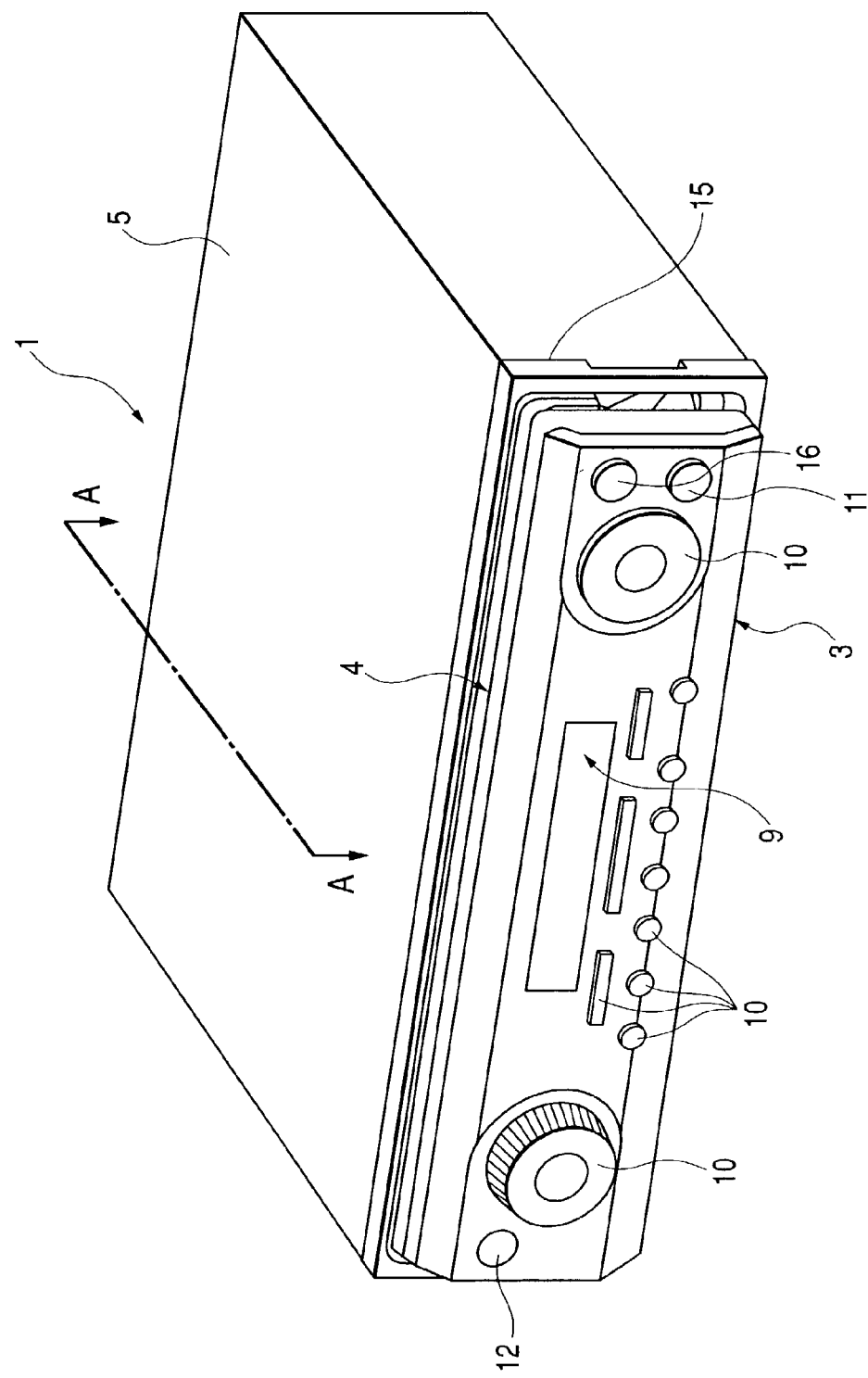
FIG. 1 is a perspective view showing a constitution of an electronic equipment used for an electronic equipment demonstration system of the present invention.
Figure 2:
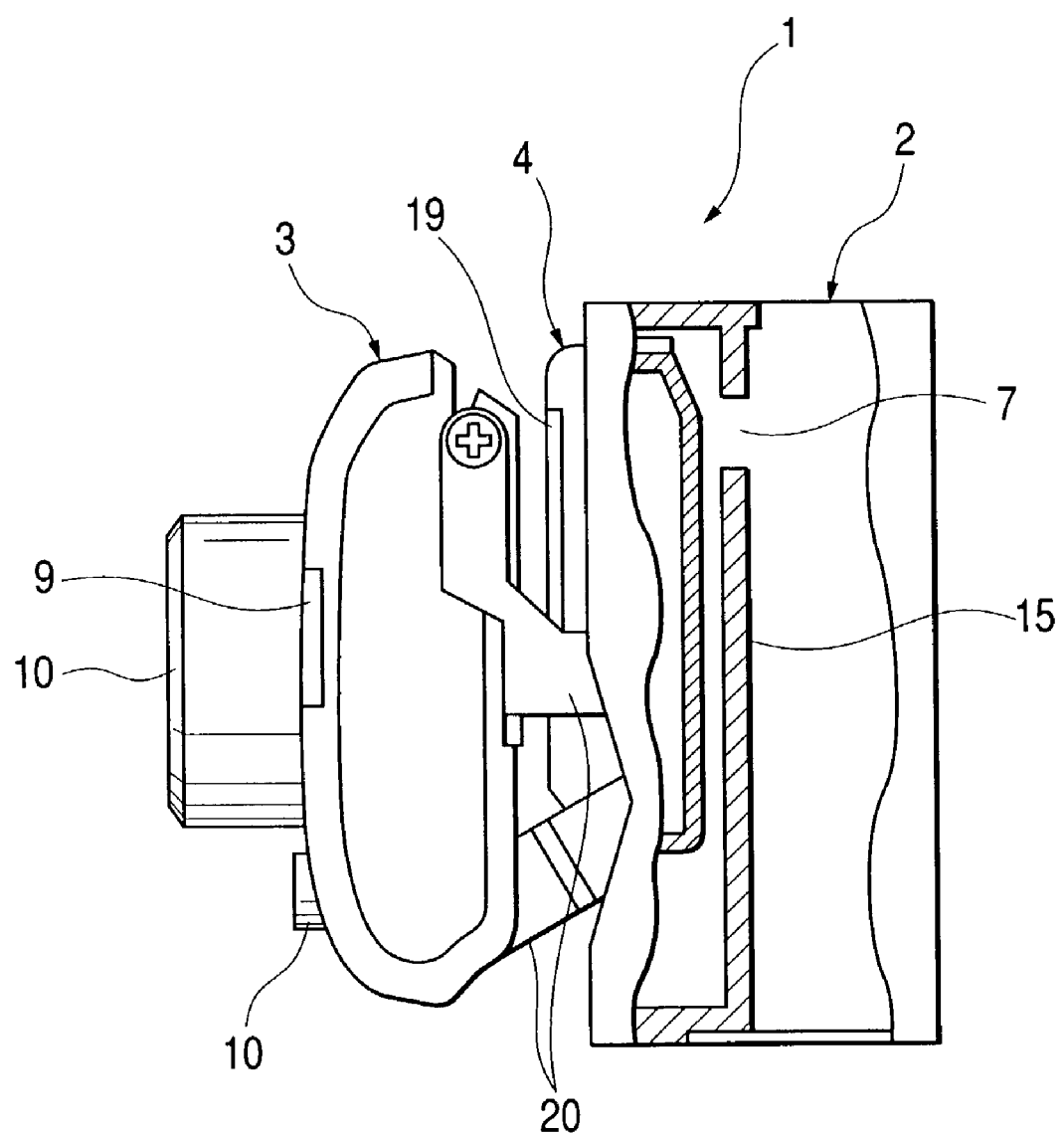
FIG. 2 is a partial sectional side view of the electronic equipment taken along line A—A of FIG. 1.
Figure 3:
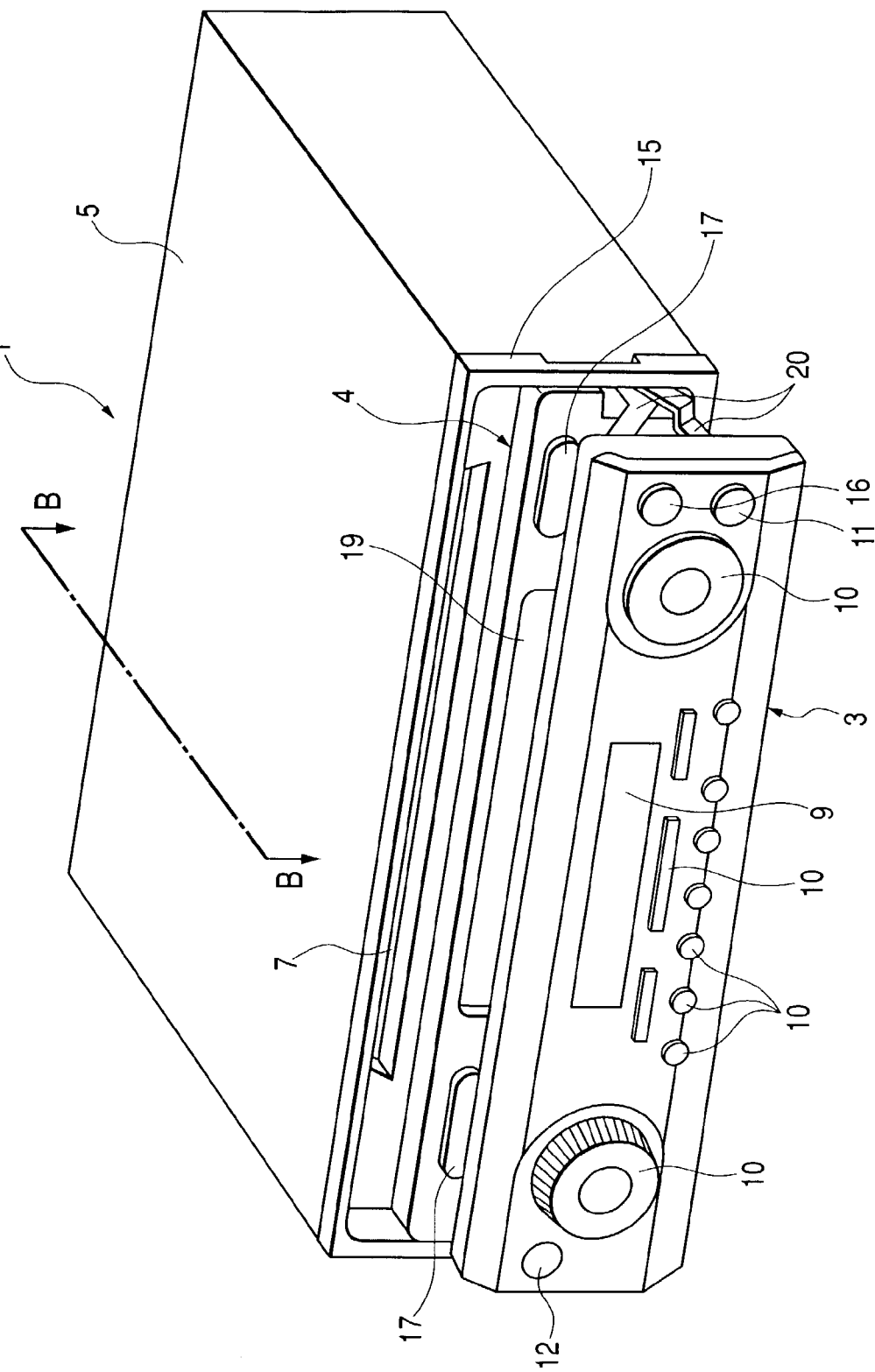
FIG. 3 is a perspective view showing a first operation state of the electronic equipment.
Figure 4:
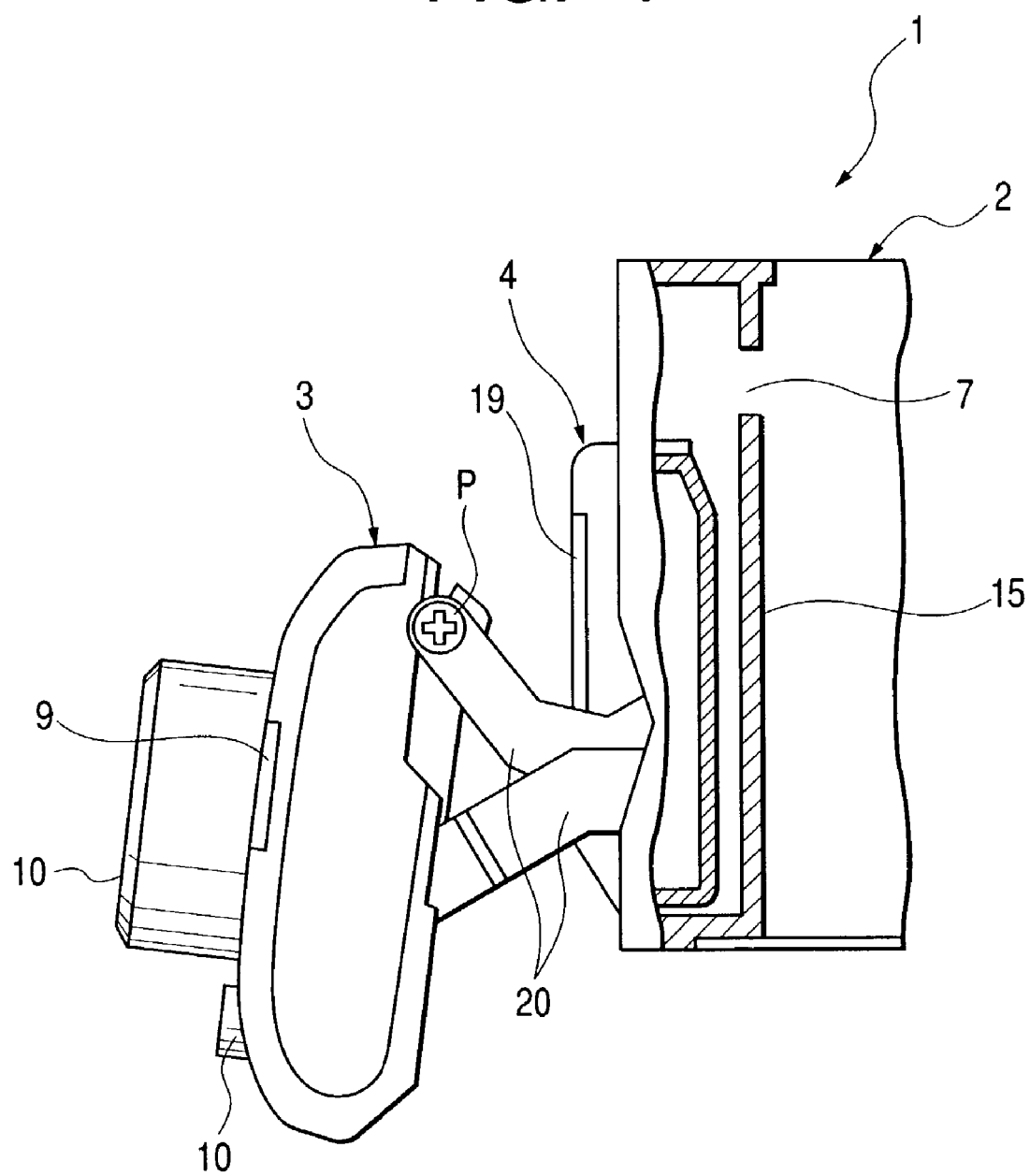
FIG. 4 is a partial sectional side view of the electronic equipment taken along line B—B of FIG. 3.
Figure 5:
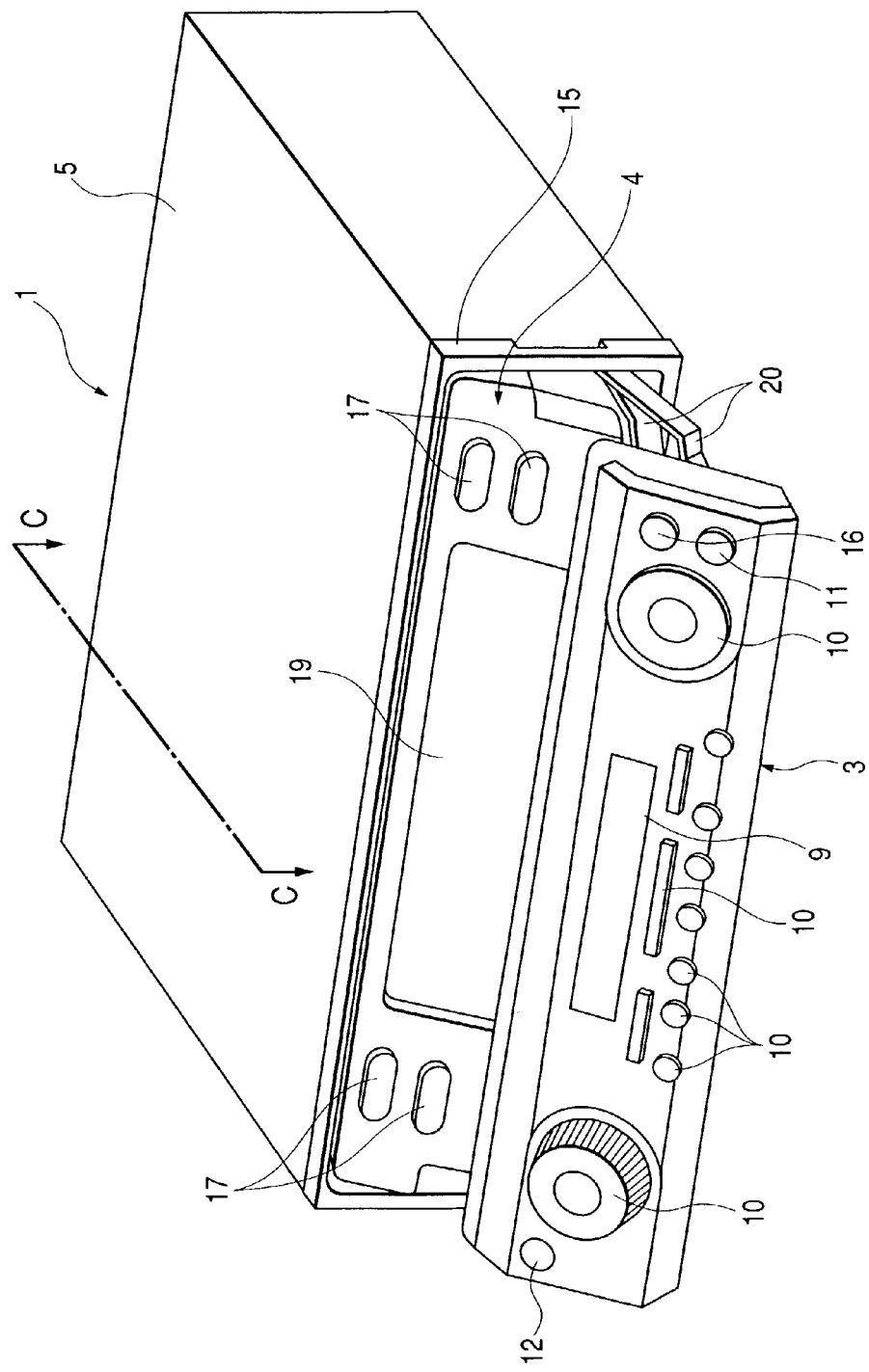
FIG. 5 is a perspective view showing a second operation state of the electronic equipment.
Figure 6:
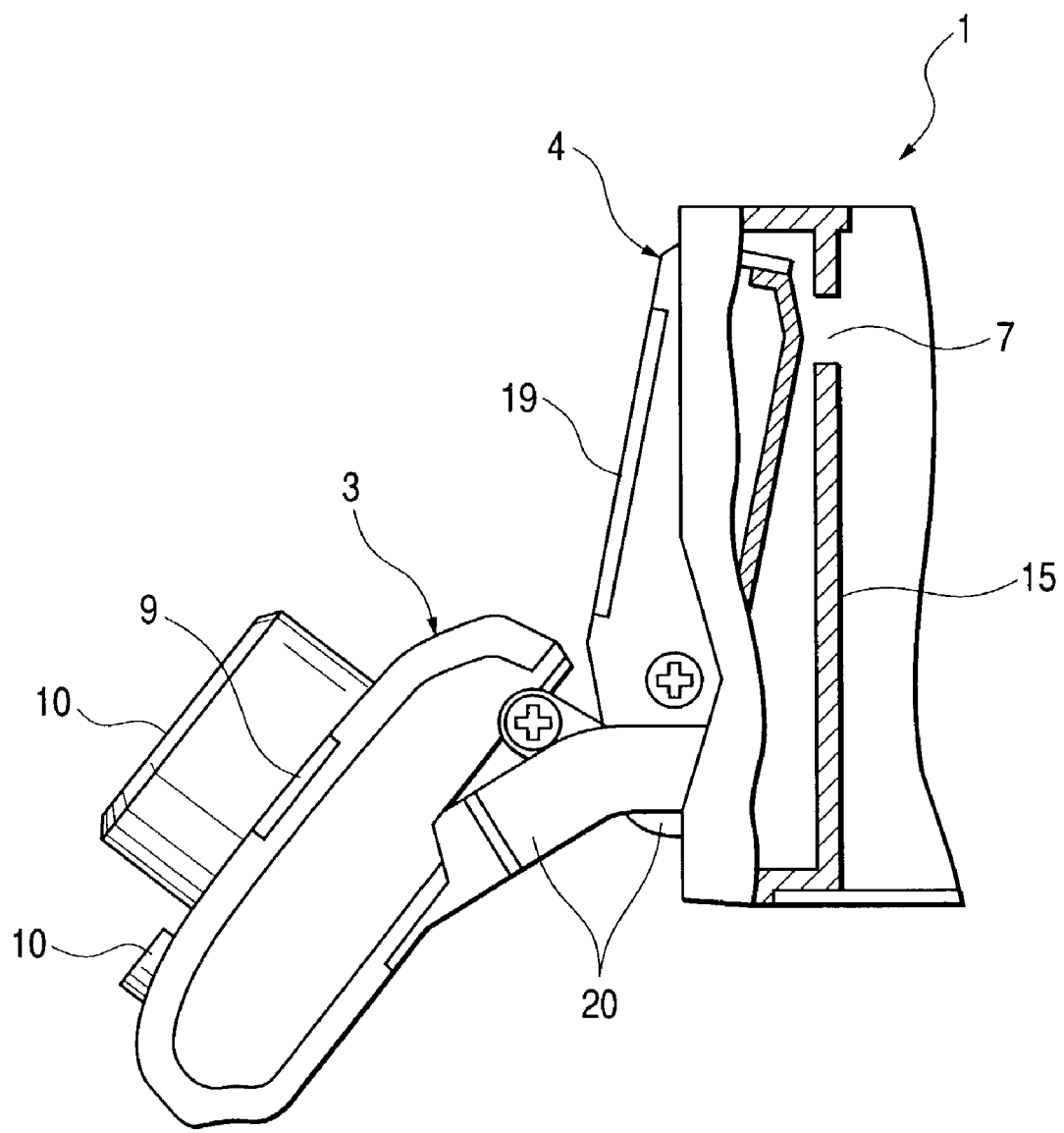
FIG. 6 is a partial sectional side view of the electronic equipment taken along line C—C of FIG. 5.
Figure 7:
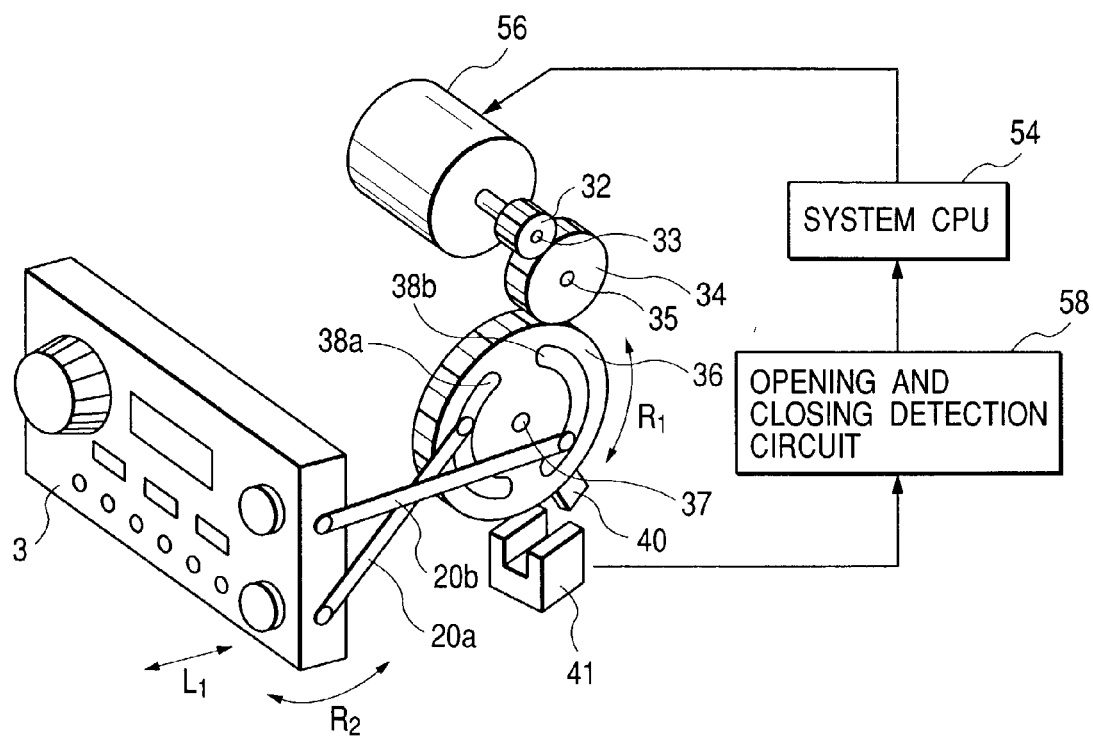
FIG. 7 is a perspective view for explaining a drive mechanism of an operation panel of the electronic equipment.

First, referring to FIGS. 1 to 7, explanations will be made into the constitution of an electronic equipment applied to an electronic equipment demonstration system of the present invention. FIGS. 1 and 2 are views showing the constitution of an electronic equipment used for the electronic equipment demonstration system of the present invention. FIGS. 3 and 4 are views showing a first operation state of the electronic equipment. FIGS. 5 and 6 are views showing a second operation state of the electronic equipment. FIG. 7 is a schematic illustration for explaining a drive mechanism of an operation panel of the electronic equipment.

As shown in FIG. 1, in the electronic equipment 1, there are provided two operation units for operating the electronic equipment 1 which are arranged in a front panel section 15 of the electronic equipment 1 being superposed in a back and forth direction. One operation unit arranged at the front side is a first operation unit 3, and the other operation unit arranged at the rear of the first operation unit is a second operation unit 4.

On a front face of the first operation unit 3, there are provided a display device 9, various operation keys 10, demonstration key 11, light receiving section 12, and open/close key 16. As shown in FIG. 5, in the second operation unit 4, there are provided an operation key 17 and display device 19.

The display device 9 of the first operation unit 3 shows a function and state of operation of the electronic equipment 1. The operation key 10 is an input key for operating the electronic equipment 1, and the demonstration key 11 is an input key for directing a start of the demonstration (referred to as "demo" hereinafter) of the electronic equipment 1. The light receiving section 12 is a portion for receiving a signal of infrared rays sent from a remote control terminal. The open/close key 16 is an input key. When this key 16 is operated, the first operation unit 3 is manually moved to a predetermined position, so that the second operation unit 4 can be visually identified by a user.

The operation key 17 of the second operation unit 4 is also an input key for operating the electronic equipment 1. The display device 19 displays a function and state of operation of the electronic equipment 1. In addition to that, the display device 19 has a function of showing a detailed explanation.

For example, a liquid crystal display device is preferably used for the display device 9. For example, Organic Electro-Luminescence is preferably used for the display device 19.

Since the two operation units of the first 3 and the second operation unit 4 are provided, it becomes possible to mount the electronic equipment on a vehicle and arrange many operation keys 10, 17 on an instrument panel, the area of which is limited. Also, it becomes possible to provide a large display device 19 having high-resolution. Although the detail will be described later, in the case of utilizing the second operation unit 4, the first operation unit 3 is moved to a predetermined position so that the second operation unit 4 can be clearly seen by the user. The number of the operation units is not limited to two but it is possible to provide more operation units. In this case, the demonstration of these operation units can be conducted in the same manner as that of the embodiment having two operation units.

The electronic equipment 1 includes various components to accomplish the functions. For example, If the electronic equipment 1 is an audio playback equipment, the electronic equipment 1 includes components such as a CD playback, MD playback and accommodation section for CD and MD. If the electronic equipment 1 is a radio receiving set, the electronic equipment 1 includes components such as a tuner for receiving AM/FM broadcasting electric waves and demodulation means for converting received electric waves into voice signals. If the electronic equipment is a television set, the electronic equipment 1 includes components such as a channel tuner for receiving image electric waves and a demodulation means for demodulating received electric waves into image signals and voice signal. It is possible to use the display device 19 of the second operation unit 4 for displaying TV images.

The demonstration of the electronic equipment 1 includes a demonstration regarding the display section and a demonstration regarding the movable section. Those demonstrations are combined with each other. Next, operation of the first operation unit 3 and the second operation unit 4 of the electronic equipment 1 regarding the demonstration of the movable section will be described below. Concerning the demonstration regarding the display section, the conventional method can be applied. Therefore, the display content will not be described here in detail.

FIG. 1 is a view showing a state in which a demonstration is started. FIG. 2 is a sectional side view taken along line A—A of FIG. 1. As can be seen in FIG. 2, the first 3 and the second operation unit 4 are arranged on the front panel 15 being superposed each other in such a manner that the first operation unit 3 is located on the front side.

Next, when the user operates the demonstration key 11 of the first operation unit 3, the demonstration of the electronic equipment 1 is started. In a first predetermined period of time, the demonstration of the display section is conducted. At this time, the demonstration is conducted in both the display device 9 of the first operation unit 3 and the display device 19 of the second operation unit 4. Accordingly, when the first operation unit 3 is open in the initial state and the display 19 can be recognized from the outside, the demonstration of the display section is started as it is. On the other hand, when the first operation unit 3 is not open, the first operation unit 3 operates so that it can be opened as shown in FIG. 5, and then the demonstration of the display section is started. Concerning the demonstration of the display section, a series of demonstration may be repeated. For example, when one demonstration requires 3 minutes and the demonstration is repeated 10 times, the required time is approximately 30 minutes. This time is set as the display section demonstration time.

Next, when the above demonstration of the display section is completed, the demonstration regarding the movable section is started. This demonstration regarding the movable section shows the user the form of operation of the movable section, and starts from the state shown in FIG. 1.

Next, the operation unit transfers to a state shown in FIG. 3. FIG. 3 shows a state in the middle of operation of opening the first operation unit 3. FIG. 4 is a sectional side view taken along line B—B of FIG. 3. As can be seen in FIG. 4, the first operation unit 3 protrudes to the front. In this embodiment, the electronic equipment 1 has a disc playback function. In the state shown in FIG. 3, the second operation unit 4 is somewhat moved downward, so that the disc insertion port 7 can be used. A demonstration in which a disc is inserted and ejected may be performed in this state. If the electronic equipment 1 is a radio receiving set in which a recording medium is not mounted, this operation of the second operation unit 4 is not necessary.

Next, the operation unit transfers to a state shown in FIG. 5. In FIG. 5, the first operation unit 3 is opened to a predetermined position. FIG. 6 is a sectional side view taken along line C—C of FIG. 5. As can be seen, the first operation unit 3 protrudes to the front, and the display face is directed upward so that the user can easily recognize it. In this case, the second operation unit 4 is also set at a little upward angle so that the user can easily recognize it. In the above state, the disc insertion port 7 is closed again based on the assumption that a disc has already been inserted.

After the operation unit has been set in the state shown in FIG. 5, it returns to the state shown in FIG. 1. In this way, the demonstration of the movable section is once completed. In the same manner as that of the demonstration of the display section, the demonstration of the movable section is conducted by a predetermined number of times. Then, the demonstration of the electronic equipment 1 is completed. In the process of operation shown in FIGS. 1 to 6, operation of a working mechanism such as a playback operation of a disc may be conducted. The demonstration is not limited to the above specific embodiment. The demonstrations regarding the display section and regarding the movable section may be continuously conducted according to any procedure and method.

Next, as an example of the mechanism to move the first operation unit 3, a drive unit 52 will be described below. As shown in FIG. 7, the first operation unit 3 is connected with cam grooves 38a, 38b of a cam 36 via arms 20a, 20b. The arms 20a, 20b are engaged with the cam grooves 38a, 38b so that they can be moved along the grooves. When the cam 36 is rotated round a rotary shaft 37 in the direction shown by arrow R1, the first operation unit 3 is moved in the direction shown by arrow L1 and rotated in the direction shown by arrow R2. Rotation of the cam 36 is controlled in such a manner that the motor 56 is rotated according to a command given by a system CPU 54. Then a gear 32, which is meshed with a gear 34, is rotated, so that the gear 34 is rotated round a rotary shaft 35.

Open/close state of the first operation unit 3 is detected by a opening and closing detection circuit 58 based on a signal sent from the opening and closing detector composed of a photo-interrupter 41 and a shutter 40 attached to the cam 36 so that the shutter 40 can screen the photo-interrupter 41. According to this detection signal, the system CPU 54 determines whether the first operation unit 3 is opened or closed, and the opening and closing motion of the first operation unit 3 is controlled by driving the motor 56. The opening and closing detection means is not limited to the optical means using the photo-interrupter 41. It is possible to use a magnetic means, electrical means and the other means. When it is necessary to move the second operation unit 4, the same mechanism as that of the first operation unit 3 may be provided in the second operation unit 4.

Next, referring to FIG. 8, a block constitution of the electronic equipment demonstration system will be described below. The electronic equipment 1 includes two operation units, that is, one is the first operation unit 3 and the other is the second operation unit 4. The two operation units are arranged on the front panel 15 while the first operation unit 3 is arranged on the front side and the second operation unit 4 is arranged on the back side.

Figure 8:
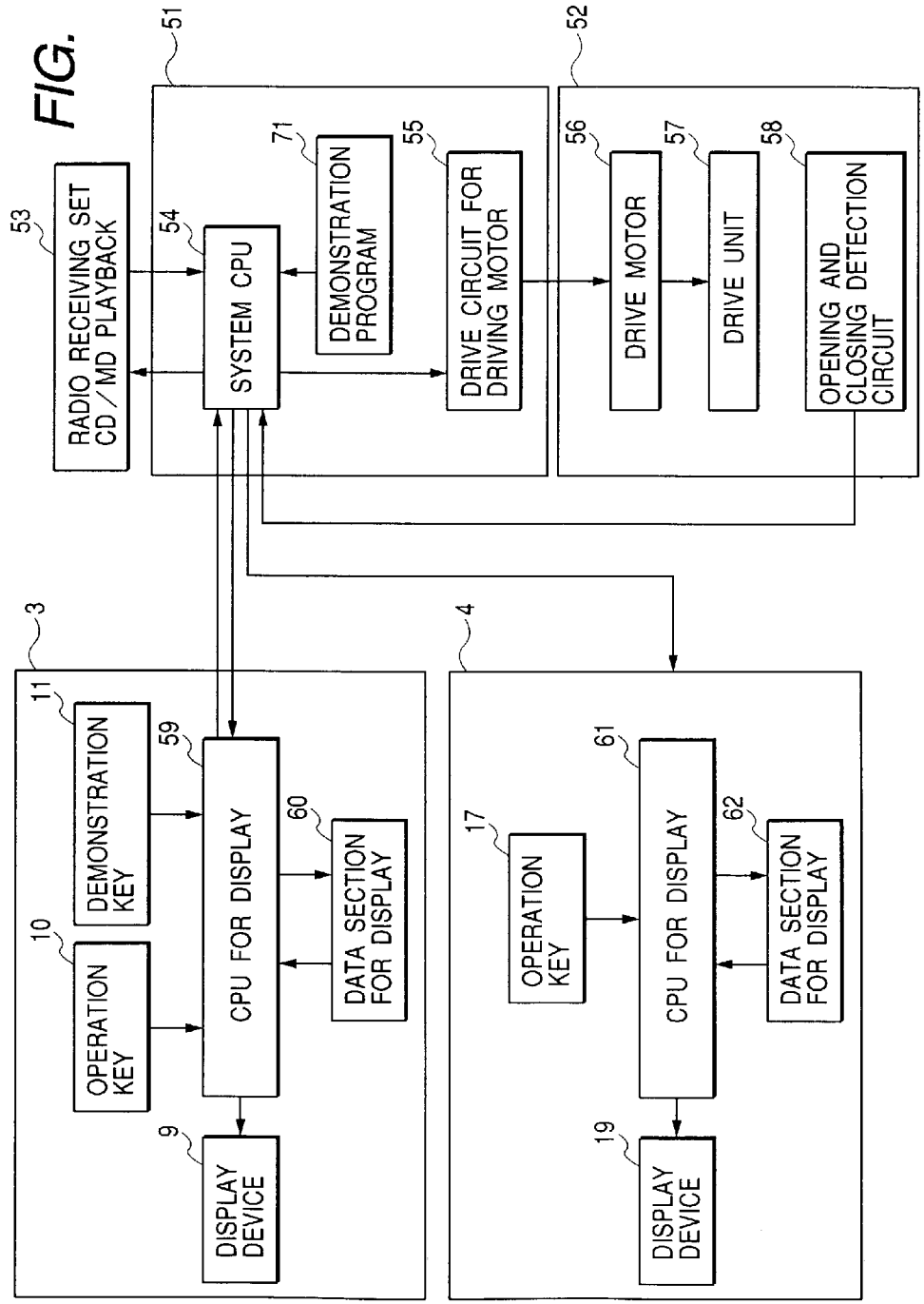
FIG. 8 is a block diagram showing a constitution of the electronic equipment demonstration system of the present invention.

As shown in FIG. 8, the electronic equipment 1 includes a first operation unit 3, second operation unit 4, circuit board 51, drive mechanism 52, and radio receiving set and/or CD/MD playback 53. The first operation unit 3 includes a display device 9, operation key 10, demonstration key 11, CPU 59 for display, and data section 60 for display. On the other hand, the second operation unit 4 includes a display device 19, operation key 17, CPU 61 for display, and data section 62 for display. The circuit board 51 includes a system CPU 54 and drive circuit 55 for driving a motor. The drive mechanism 52 includes a motor 56 for driving, drive unit 57, and opening and closing detection circuit 58 of the first operation unit 3.

Since many operation keys 10 need be provided in the first operation unit 3, it is impossible to arrange a large display device in the first operation unit 3. On the other hand, the number of the operation keys 17 arranged in the second operation unit 4 is reduced as small as possible, so that the large display device 19 having high-resolution is arranged in the second operation unit 4.

Next, operation will be described below. A command to start a demonstration is input from the demonstration key 11 and transmitted to the system CPU 54 via the CPU 59 for display. When the system CPU 54 determines that the input is a command to start a demonstration, the demonstration program 71 is executed. The demonstration program 71 includes a demonstration program of the display device and demonstration program of the movable section. These two programs are continuously executed under a predetermined condition. These programs can be rewritten. Further, a jumping condition included in these programs can be changed by operating the operation key 10.

First, the display device conducts a demonstration. Display is conducted on the display device 9 from the system CPU 54 via CPU 59 for display of the first operation unit 3 according to the character information accommodated in the data section 60 for display. Detailed information is not displayed on this display device 9 but only simple information is displayed.

In the case of a demonstration for displaying detailed information, the first operation unit 3 is moved to a predetermined position, so that the second operation unit 4 can be recognized from the outside. Next, display is conducted on the display device 19 from the system CPU 54 via the CPU 61 for display of the second operation unit 4 according to character information accommodated in the data section 62 for display. This display device 19 can display detailed information, and the data section 62 for display accommodates detailed information.

When the demonstration has been conducted on the display device by a predetermined number of times, a demonstration of the drive section is started according to the demonstration program 71. The system CPU 54 operates the drive circuit 55 for driving a motor, and the drive motor 56 of the drive section 52 and the drive unit 57 are driven and the first operation unit 3 is moved to a predetermined position so that the second operation unit 4 can be recognized from the outside. Whether the first operation unit 3 is opened or closed is detected by the opening and closing circuit 58. According to the result of detection, if the first operation unit 3 is not open, the system CPU 54 gives a command of opening the first operation unit 3. When the first operation unit 3 has been opened, the opening operation is stopped. When the first operation unit 3 is closed from the open condition, the same operation is conducted.

After the opening and closing operation of the first operation unit 3 is completed, a series of demonstration is completed. It is possible for the series of demonstration to include an operation of the built-in device such as a radio receiving and CD/MD playback 53, for example, it is possible for the series of demonstration to include a disc loading and playback operation. In case in which the second operation unit 4 need be moved, the same drive means as that of the first operation unit 3 is provided so as to realize the movement of the second operation unit 4.

The above system may be applied to not only electronic equipment handling voice but also electronic equipment handling image. Further, the above system may be applied to not only electronic equipment for vehicle use but also electronic equipment for home use.

Figure 9:
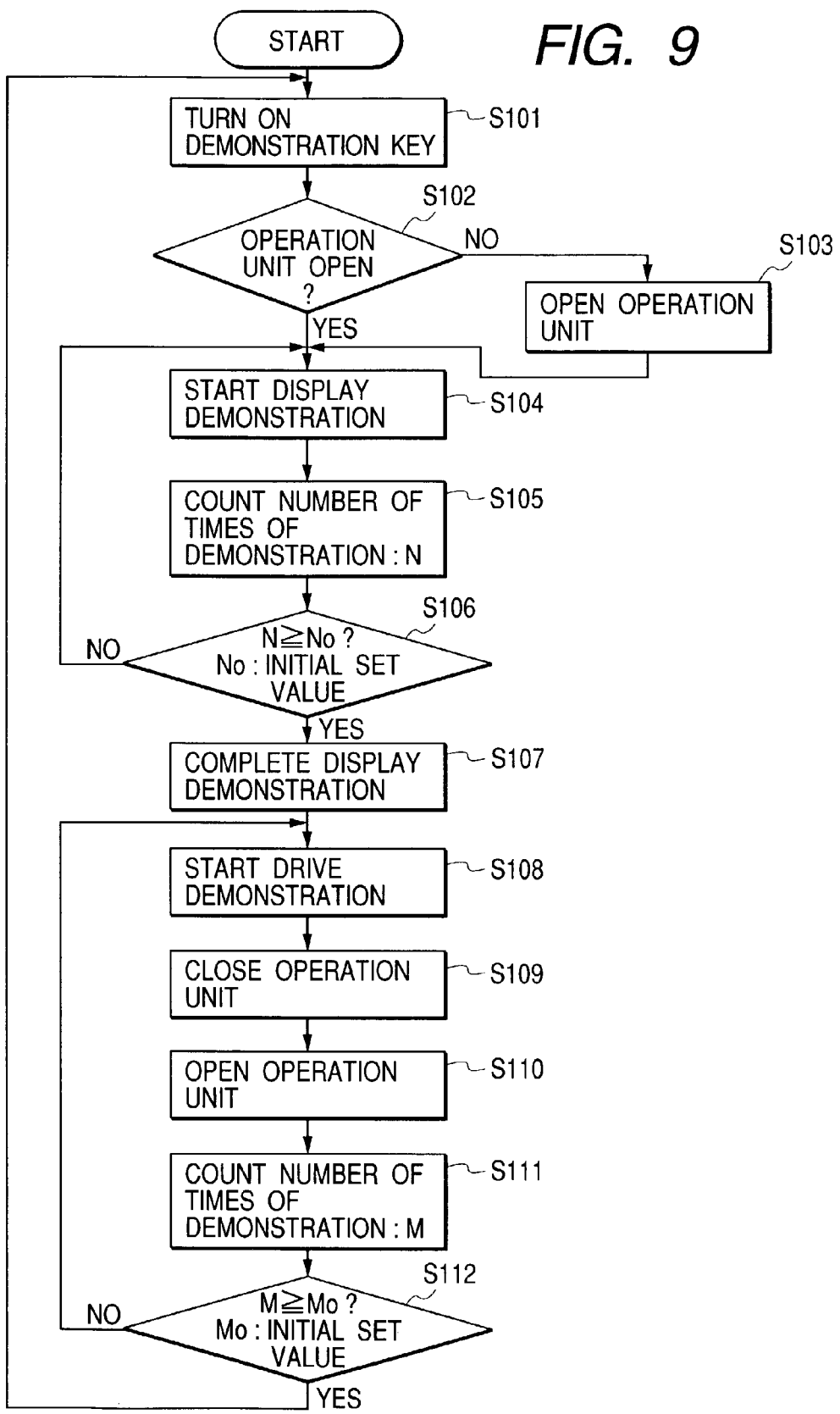
FIG. 9 is a flow chart showing a flow of operation of the electronic equipment demonstration system of the present invention.

Next, referring to FIG. 9, a flow of operation of the electronic equipment demonstration system of the present invention will be described. The first operation unit 3 is assumed to be movable, and the second operation unit 4 is assumed to be stationary.

First, the demonstration key 11 is turned on (step S101) Then, the system CPU 54 watches the result of detection sent from the opening and closing detection circuit 58 and determines whether or not the first operation unit 3 is open (step S102) In the case where the first operation unit 3 is not open, the first operation unit 3 is opened (step S103). It is possible to adopt a constitution in which a demonstration is started by a predetermined combination of the operation keys 10 instead of the exclusive demonstration key 11.

Next, the display demonstration is started (step S104). In the display demonstration, the display device 9 of the first operation unit 3 successively displays simple information, and the display device 19 of the second operation unit 4 successively displays detailed information. For example, the display device 9 successively displays operation items of the electronic equipment, and the display device 19 successively displays the detailed explanations of the items together with image if necessary.

Next, the number N of times of the display demonstration is counted (step S105), and it is determined whether or not the counted number N is not less than the number $N_0$ which has been initially set (step S106). If the counted number N is smaller than $N_0$, the program returns to step S104, and the display demonstration is started again. When the counted number N reaches $N_0$, the display demonstration is completed (step S107). For example, in the case where $N_0$ is set at ten times and the time necessary for one demonstration is approximately 3 minutes, the demonstration regarding the display section is completed in about 30 minutes. $N_0$ is not limited to 10 times but $N_0$ may be set at an arbitrary value. Further, $N_0$ may be set at an arbitrary value by inputting from the outside.

After the display demonstration has been completed, the drive demonstration is started (step S108). This drive demonstration shows an actual operation of the movable section of the electronic equipment. First, the first operation unit 3, which is open, is closed (step S109), and then the first operation unit 3 is opened (step S110). Next, the number M of times of the drive demonstration is counted (step S111), and it is determined whether or not the counted value M is not less than the number $M_0$ of times which has been initially set (step S112). If the counted value M does not reach $M_0$, the program returns to step S108, and the drive demonstration is started again. When the counted value M reaches $M_0$, the program returns to step S101 and waits for the next demonstration. $M_0$ may be set at an arbitrary value. Further, $M_0$ may be set at an arbitrary value by inputting from the outside.

As described above, the demonstration of the electronic equipment including a display and operation is conducted, and a user can sufficiently, visually understand the operation, function and ability of the electronic equipment. In the case where the second operation unit is movable, the second operation unit 4 may be operated in the same manner as that of the first operation unit 3 in each operation step of the first operation unit 3. The flow of operation is not limited to the above specific embodiment but the other flow of operation may be adopted.

Figure 10:
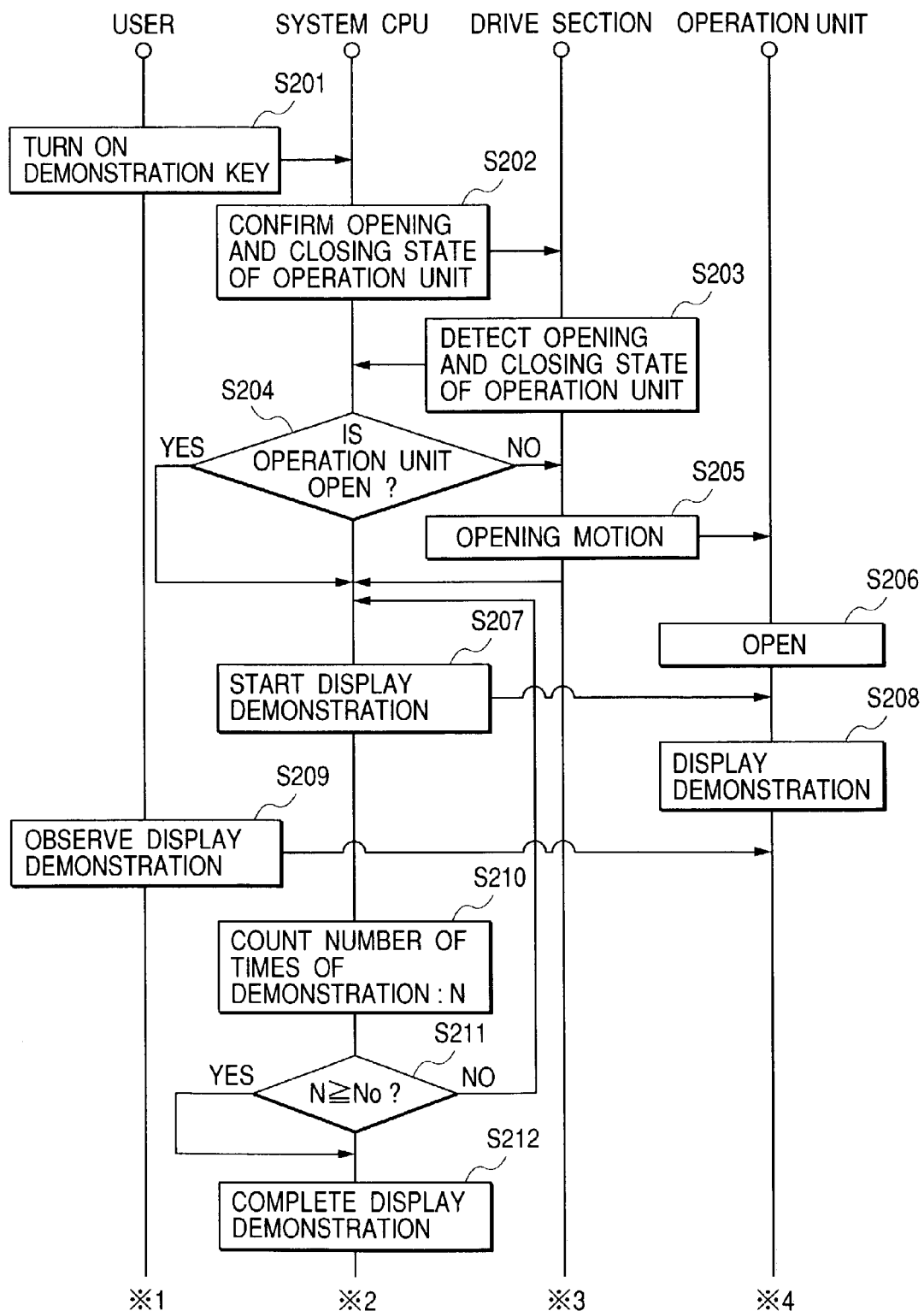
FIG. 10 is a sequence chart showing a relation of operation of the components of the electronic equipment demonstration system of the present invention.
Figure 11:
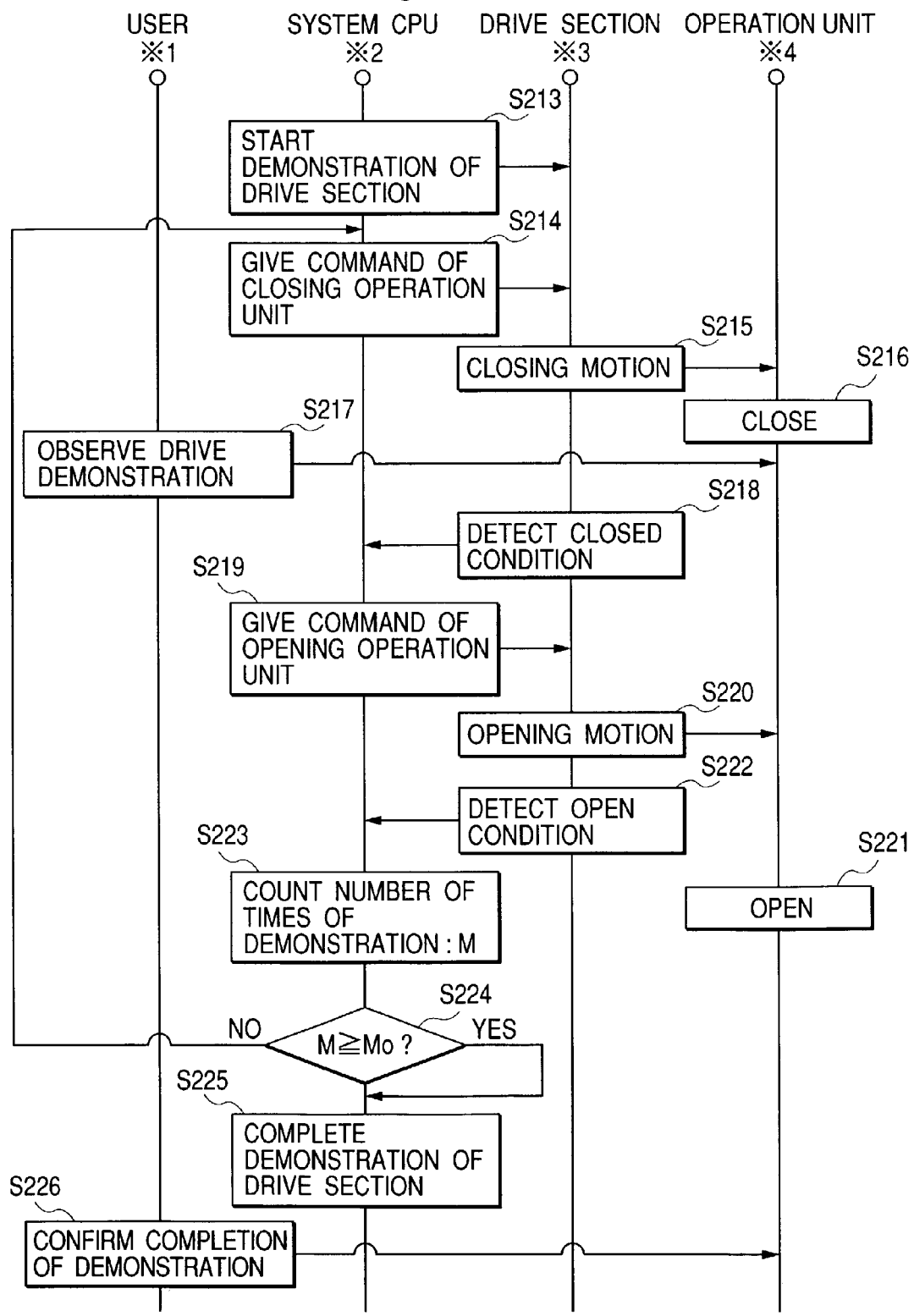
FIG. 11 is a sequence chart continuing to FIG. 10.

Next, referring to sequence charts shown in FIGS. 10 and 11, an interaction between the components of the electronic equipment demonstration system will be described in accordance with the flow of time as follows. In the sequence charts, the longitudinal direction represents the lapse of time. There are components including a user, CPU of the system, drive section and first operation unit. Reference marks X1 to X4 shown in FIG. 10 continue to reference marks X1 to X4 shown in FIG. 11.

First, the user turns on the demonstration key 11 (step S201). When this operation is conducted, the system CPU 54 requests information for confirming the opening and closing state of the first operation unit 3 to the drive section 52 (step S202). The opening and closing state of the first operation unit 3 is detected by the opening and closing detection circuit 58 of the drive section 52 (step S203). According to this information, the system CPU 54 determines whether or not the first operation unit 3 is open (step S204). If the first operation unit 3 is not open, the system CPU 54 gives a command to the drive section 52 so that the first operation unit 3 is opened. Therefore, the drive section 52 is opened (step S205), and the first operation unit 3 is opened (step S206).

Under the condition that the first operation unit 3 is open, the system CPU 54 starts a display demonstration for the display section 9 of the first operation unit 3 and the display section 19 of the second operation unit 4 (step S207). In this way, the display demonstration is conducted in the display sections 9 and 19 (step S208). The user observes this display (step S209).

Next, the system CPU 54 counts the number N of times of the display demonstration (step S210), and it is determined whether or not the number N of times of the display demonstration has reached the number $N_0$ of times which was initially set (step S211). When the number N of times of the display demonstration has not reached the number $N_0$ of times which was initially set, the display demonstration is repeated from step S207. When the number N of times of the display demonstration has reached the number $N_0$ of times which is initially set, the display demonstration is completed (step S212).

When the display demonstration is completed, the system CPU 54 starts a demonstration of the drive section 52 (step S213). The system CPU 54 gives a command to the drive section 52 so that the first operation unit 3, which is open, is closed (step S214). According to the command, the drive section 52 conducts a closing motion (step S215), and the first operation unit 3 returns to the closed condition (step S216). The user observes the demonstration conducted thereafter (step S217).

The opening and closing state is detected by the opening and closing detection circuit 58 of the drive section 52 (step S218). According to this information, CPU 54 knows that the first operation unit 3 is in a closed state, and then CPU 54 gives a command to the drive section 52 so that the first operation unit 3 is opened (step S219). According to this command, the drive section 52 conducts operation of opening the first operation unit 3 (step S220), and then the first operation unit 3 is opened (step S221).

When the opening and closing detection circuit 58 of the drive section 52 detects that the first operation unit 3 is opened (step S222), the system CPU 54 counts the number M of times of the drive demonstration (step S223). It is determined whether or not the number M of times of the count has reached $M_0$ which is initially set (step S224). If the number M of times of the count has not reached $M_0$ which is initially set, the program returns to step S214, and the drive demonstration is started again. When the number M of times of the count has reached $M_0$, the drive demonstration is completed (step S225) When the drive demonstration is completed, the program returns to step S201 and waits for the next demonstration. The user confirms completion of a series of demonstration (step S226) and conducts operation to complete the demonstration if necessary.

It should be noted that the present invention is not limited to the above specific embodiment. Variations may be made by one skilled in the art without departing from the spirit and scope of the invention. A demonstration system and demonstration method of electronic equipment, in which the variations are made in this way, are included in the technical concept of the present invention.

As described above, according to the electronic equipment demonstration system and method of the present invention, not only the demonstration on the display section provided in the operation unit of the electronic equipment but also the demonstration of the actual movement operation of the operation unit can be conducted. Therefore, operation of the movable section can be visually recognized, so that the user can more sufficiently understand the function of the electronic equipment. Further, since such a demonstration gives visually interesting impression to the user, the effect of the demonstration can be enhanced.

What is claimed is:

1. A demonstration system of an electronic equipment, comprising:
    a plurality of movable operation units being disposed on a front panel of the electronic equipment, said plurality of movable operation units having an plurality of operation faces,
    wherein one of said plurality of movable operation units comprises:
    a plurality of input operation parts for inputting a command of operation of the electronic equipment;
    a demonstration operation part for giving a command of starting demonstration; and
    a display part for displaying information pertaining to the electronic equipment,
    wherein the electronic equipment comprises:
    a movement control part for controlling a movement of the operation unit;
    a display controller for controlling a display demonstration of the display part; and
    a drive controller for controlling a movable section demonstration,
    wherein a front side movable operation unit moves to expose a rear operation unit.

2. A demonstration system of an electronic equipment according to claim 1, wherein the display demonstration and the movable section demonstration are continuously conducted under a predetermined condition.

3. A demonstration system of an electronic equipment according to claim 2, wherein the predetermined condition is the number of times of continuous execution of the display demonstration and/or the number of times of continuous execution of the movable section demonstration.

4. A demonstration system of an electronic equipment according to claim 1, wherein the plurality of movable operation units are arranged on the front panel and being superposed to each other back and forth, the plurality of operation units are movable individually.

5. A demonstration system of an electronic equipment according to claim 4, further comprising a receiving part for receiving a remote control signal disposed in a predetermined portion of the operation unit arranged on the front face of the plurality of operation units.

6. A demonstration system of an electronic equipment according to claim 1, wherein the display controller is provided with a rewritable control program.

7. A demonstration system of an electronic equipment according to claim 6, wherein the number of times of the display demonstration in the control program can be set by the input operation parts.

8. A demonstration system of an electronic equipment according to claim 1, wherein the drive controller is provided with a rewritable control program.

9. A demonstration system of an electronic equipment according to claim 8, wherein the number of times of the movable section demonstration in the control program can be set by the input operation parts.

10. A demonstration system of an electronic equipment according to claim 1, wherein the demonstration operation part is structured by operation keys disposed on the operation unit.

11. A demonstration system of an electronic equipment, comprising:
    a movable first operation unit being disposed on a front panel of the electronic equipment, the movable first operation unit having an operation face;
    a second operation unit having a display part and disposed behind the movable first operation unit,
    wherein the movable first operation unit comprises:
    a plurality of input operation parts for inputting a command of operation of the electronic equipment; and
    a demonstration operation part for giving a command of starting a display demonstration and a movable section demonstration;
    wherein the second operation unit comprises a display for displaying information pertaining to the electronic equipment,
    wherein the electronic equipment comprises a controller that controls a movement of the moveable first operation unit, that controls a display demonstration of the display part, and that controls a movable section demonstration wherein the first movable operation unit moves to expose the second operation unit.

12. A demonstration system of an electronic equipment according to claim 11, wherein the display demonstration and the movable section demonstration are continuously conducted under a predetermined condition.

13. A demonstration system of an electronic equipment according to claim 11, wherein the controller is provided with a rewritable control program for controlling the display demonstration.

14. A demonstration system of an electronic equipment according to claim 13, wherein the number of times of the display demonstration in the control program can be set by the input operation parts.

15. A demonstration system of an electronic equipment according to claim 11, wherein the controller is provided with a rewritable control program for controlling the movable section demonstration.

16. A demonstration system of an electronic equipment according to claim 15, wherein the number of times of the movable section demonstration in the control program can be set by the input operation parts.

17. A demonstration system of an electronic equipment, comprising:
    a movable operation unit being disposed on a front panel of the electronic equipment, the movable operation unit having an operation face,
    wherein the movable operation unit comprises:
    a plurality of input operation parts for inputting a command of operation of the electronic equipment;

a demonstration operation part for giving a command of starting demonstration; and a display part for displaying information pertaining to the electronic equipment, wherein the electronic equipment comprises:

a movement control part for controlling a movement of the operation unit;

a display controller for controlling a display demonstration of the display part; and a drive controller for controlling a movable section demonstration, wherein the operation unit comprises a plurality of operation units which are arranged on the front panel and being superposed to each other back and forth, the plurality of operation units are movable individually.

\* \* \* \* \*